July 13, 1926.
G. W. HEEREN
DISK HARROW
Filed Feb. 18, 1926
1,592,566
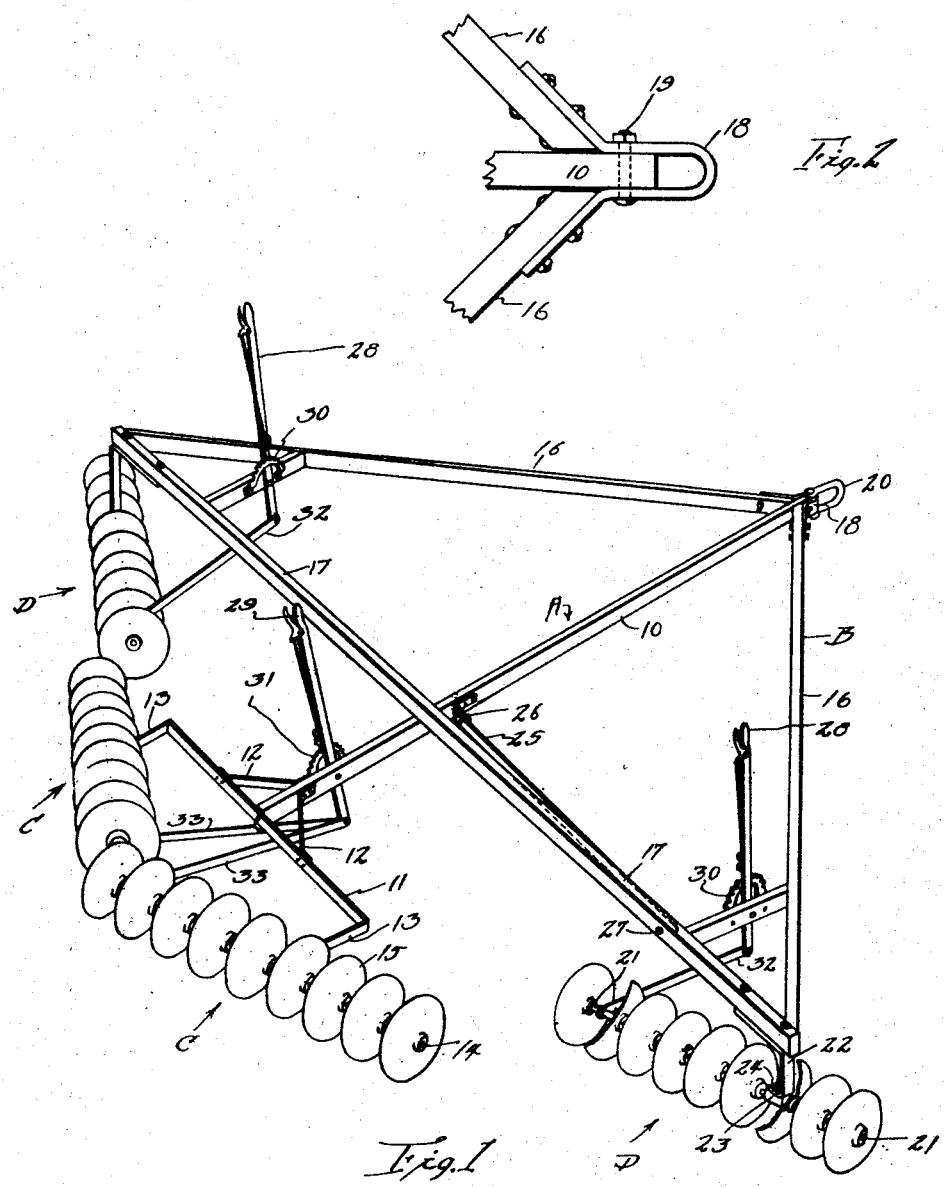
Inventor
Gert W. Heeren Patented July 13, 1926.

1,592,566

UNITED STATES PATENT OFFICE.

GERT W. HEEREN, OF LE MARS, IOWA.

DISK HARROW.

Application filed February 18, 1926. Serial No. 89,082.

My invention relates to harrows, and has for its principal object to provide a harrow in which four gangs of tools, arranged broadside, may be employed.

More particularly, my invention relates to a disk harrow embodying inner and outer gangs of disks supported on frames which are so movable relative to each other as to allow vertical movement of the outer gangs independently of the inner gangs, and yet to preserve the lateral relation of the gangs.

A further object is to provide a very simple frame for accomplishing the above object.

Another object is to provide simple means for mounting the gangs of tools for angular adjustment in a horizontal plane.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a perspective view of the harrow, and

Fig. 2 is a detail plan view of the forward end of the frame.

My harrow embodies two frames, A and B. The frame, A, has a central longitudinal beam, 10, on the rear end of which is a cross arm, 11, braced to the beam, 10, by means of braces, 12. The ends of the arm, 11, extend rearwardly as at 13, and the disk shafts, 14, are preferably secured thereto in a manner which will hereinafter be described, with relation to the other gangs of disks. The disks, 15, are mounted on the disk shafts, 14.

I will refer to the gangs of disks just described as the inner gangs, or the gangs, C.

The frame, B, is triangular in shape and comprises the rearwardly diverging side beams, 16, connected at their rear ends by a cross beam, 17, and at their forward ends by a yoke, 18. (See Fig. 2.) The yoke, 18, receives the forward end of the central, longitudinal beam, 10, and is pivoted thereto by a bolt, 19, as shown in Fig. 2. A clevis, 20, may be secured to the yoke, 18, for the application of power to the harrow.

It will now be seen that the frame, B, is so connected with the beam, 10, that it may swing vertically at its rear extremity. A sufficiently loose connection is had so that the cross beam, 17, may also tilt laterally so as to allow one of the extremities of the frame, B, to move more than the other in a vertical direction.

The disk shafts, 21, are pivotally secured to brackets, 22, depending from the rear corners of the frame, B, by means of sleeves, 23, carried by the shafts, which are pivoted by means of bolts, 24, to the arms, 22.

The same construction as that just described is observed in mounting the gangs, C.

The gangs supported from the frame, B, will be referred to hereinafter as the gangs, D, or the outer gangs.

It will now be seen that as the harrow is directed over uneven ground the frame, B, will be allowed to tilt in such a manner that the outer gangs, D, may follow depressions or elevations in the surface of the ground without altering the depth of the contact of the gangs, C, and without being themselves lifted from the ground. This is essential where such a wide space is covered as may be covered in a harrow embodying four broadside gangs.

The gangs, C, may tilt laterally to take care of the irregularities in their immediate path independent of any irregularities which may affect the outer gangs. It will be seen, however, that in shifting direction the pull upon the gangs would tend to swing the beam, 10, laterally in one direction or the other relative to the frame, B, were not some means provided for preventing such lateral movement.

I therefore provide the tie link, 25, which is pivoted to a bracket, 26, secured to the beam, 10, and pivoted at 27 to the cross beam, 17. The tie link, 25, does not interfere with the tilting of the arm, 11, and does not interfere with the vertical movement of the cross beam, 17, relative to the beam, 10.

The arrangement is very simple and inexpensive and yet I find it gives the necessary flexibility to assure perfect cultivation over a wide area.

In order to provide for angular adjustment of the gangs, C and D, I provide the adjusting levers, 28 and 29, pivoted to sectors, 30 and 31, respectively, on the frames, B and A, respectively, and connected to the shafts, 21 and 14, respectively, by means of links, 32 and 33, respectively. Movement of the levers rearwardly will increase the angle between the gangs and their respective lateral frames.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A harrow comprising a central longitudinal beam, side beams secured to said longitudinal beam near its forward end, said side beams diverging rearwardly and being secured together by a cross beam, a tie link connecting the longitudinal beam with the cross beam in such a manner as to allow vertical movement and to prevent lateral movement of the longitudinal beam relative to the cross beam, cultivating elements carried by the longitudinal beam, and cultivating elements, carried by the cross beam, positioned laterally beyond said first mentioned cultivating elements.

2. A harrow comprising a central longitudinal beam, a triangular shaped frame pivoted at its apex to the longitudinal beam, and extending rearwardly, said frame including a cross beam crossing said longitudinal beam, a tie link connecting the cross beam with the longitudinal beam in such a manner as to allow vertical movement and to prevent lateral movement of said beams relative to each other, cultivating elements carried by the longitudinal beam, and cultivating elements carried by said frame, positioned laterally beyond said first mentioned cultivating elements.

3. In a device of the class described comprising a central frame having an extended longitudinal portion and carrying at its rear end a gang of cultivating elements, an auxiliary frame hitched to said central frame near the forward end of the longitudinal portion thereof, said auxiliary frame having a member crossing said longitudinal portion, a tie link connecting said last mentioned member with the longitudinal portion in such a manner as to allow vertical movement and to prevent lateral movement of the two frames relative to each other, and cultivating elements carried by said auxiliary frame and positioned laterally on either side of said first mentioned cultivating elements.

4. In a device of the class described comprising a central longitudinal frame and an auxiliary frame hitched to said longitudinal frame near its forward end and having a member crossing said longitudinal frame, a tie link connecting said last mentioned member with the longitudinal frame in such a manner as to allow vertical movement and to prevent lateral movement of the said frames relative to each other, cultivating elements carried by said longitudinal frame and cultivating elements carried by said auxiliary frame and positioned laterally on either side of the said first mentioned cultivating elements.

Signed at Sioux City, in the county of Woodbury and State of Iowa, this 15th day of February, 1926.

GERT W. HEEREN.